Figure 1:
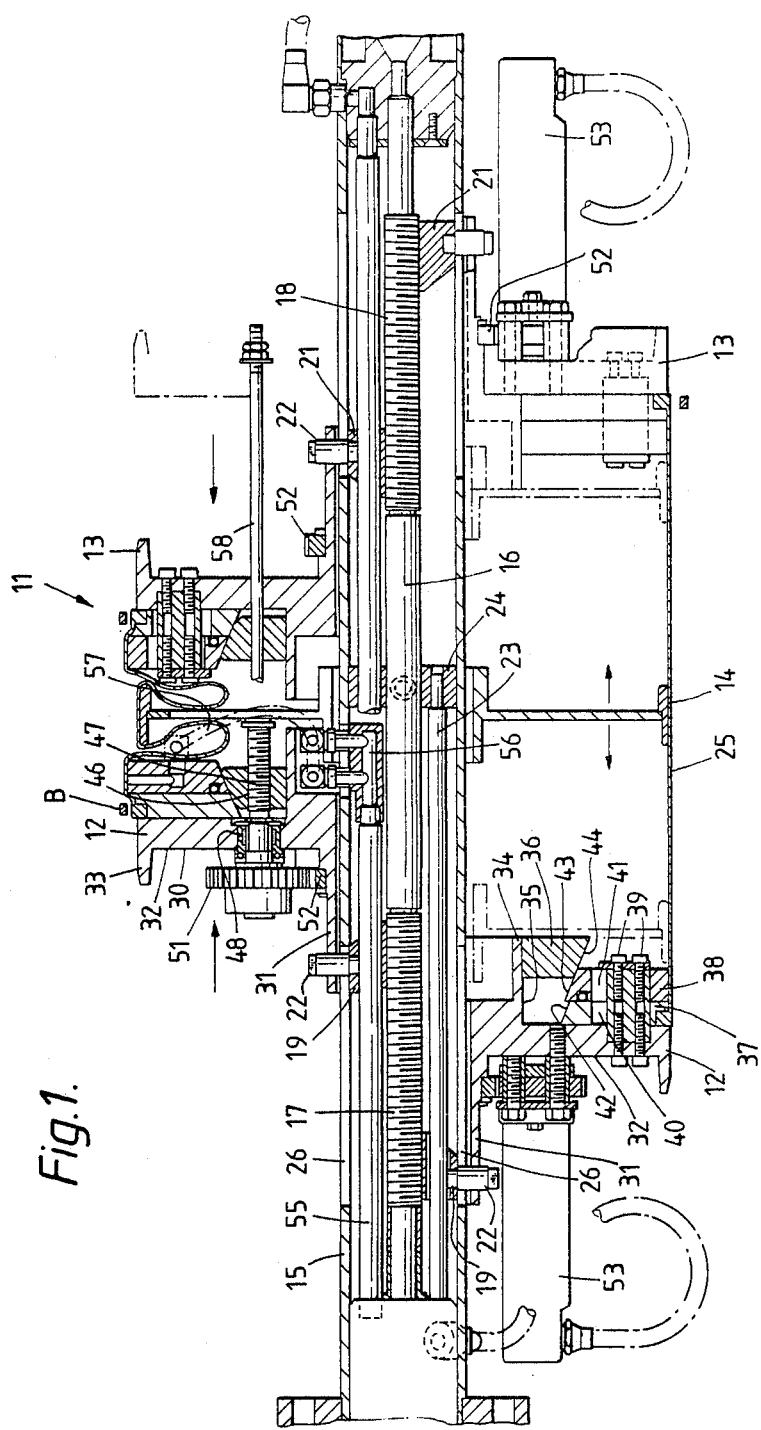

United States Patent [19]

Wright

[11] Patent Number: 4,812,197

[45] Date of Patent: Mar. 14, 1989

[54] FIRE BUILDING DRUM

[75] Inventor: Anthony R. Wright, Merseyside, United Kingdom

[73] Assignee: Apsley Metals Limited, United Kingdom

[21] Appl. No.: 155,560

[22] Filed: Feb. 12, 1988

[30] Foreign Application Priority Data

Feb. 12, 1987 [GB] United Kingdom ............... 8703224

[51] Int. Cl.⁴ ............................................. B29D 30/24
[52] U.S. Cl. ..................................... 156/415; 156/417
[58] Field of Search .................... 156/414, 415, 417

[56] References Cited

U.S. PATENT DOCUMENTS 4,155,796  5/1979  Rambacher ........................... 156/417
4,239,579 12/1980  Felton et al. ......................... 156/415
4,683,021  7/1987  Stalter et al. ........................ 156/415

FOREIGN PATENT DOCUMENTS 86539   12/1986  Luxembourg .
2179009  2/1987  United Kingdom .

Primary Examiner—Willard Hoag
Attorney, Agent, or Firm—Stevens, Davis, Miller & Mosher

[57] ABSTRACT

A cylindrical tire building former has two sets of radially expandable segments or located one set at each axial end of the former.

The sets of segments or are expanded by engagement of each segment with an axially moveable wedge member. The wedge member may comprise an annular body, or an annular array of individual wedges. The wedge member is moved by operation of a plurality of screw struts which are arranged on a pitch circle and which are each rotated by a planet gear. The planet gears are driven simultaneously by a central sun gear to move the wedge member evenly along the screw struts.

8 Claims, 3 Drawing Sheets

1

FIRE BUILDING DRUM

This invention relates to tire building formers and in particular but not exclusively to formers known as full stage formers on which an inner liner and carcass can be laid, and which can also then be used for the addition of other tire components such as beads, apex, etc., and then for shaping the carcass into torroidal form prior to addition of the breakers and tread.

The present invention provides a former having a set of radially expandable segments which are operated by a simplified mechanism.

Accordingly there is provided a cylindrical tire building former having a set of radially expandable segments which are radially moveable by engagement of each segment with a respective cam surface on an axially moveable wedge member characterised in that the wedge member is axially moved along a plurality circumferentially spaced screw struts which are each rotated by a planet gear fixed thereto, the planet gears being driven by a sun gear.

The expandable segments are particularly useful in a former of the type described in co-pending British Application No. 8618649, and therefore the drum comprises three coaxial discs mounted on a shaft, two outer discs being simultaneously moveable towards and away from each other, and the central disc being independantly moveable between the two outer discs, and one set of radially expandable segments is arranged on each of the two outer discs on the axially inner side thereof, the respective wedge members being slideable on an axially inwardly extending sleeve forming part of the disc.

The invention will be described by way of example and with reference to the accompanying drawings in which:

FIG. 1 shows a longitudinal cross-section through a tire building former according to this invention, and which is shown above the rotational axis in the closed up state for torroidal forming of the carcass, and is shown below the rotational axis in the open state for formation of a cylindrical carcass ply, and FIGS. 2-7 are a schematic cross-section through the through the building former of FIG. 1 showing the former at various stages of a tire building process.

A tire building former 11, particularly but not exclusively for building passenger car radial carcass tires, comprises three coaxial axially moveable discs 12, 13 and 14. The three discs 12, 13 and 14 are slideably mounted on a hollow shaft 15. The two axially outer discs 12 and 13 are axially moveable by an internal screw threaded strut 16 having oppositely handed screw threaded portions 17 and 18 which are each respectively connected to a bush 19 and 21 slideable within the shaft 15, and each bush 19 or 21 is fixed via pins 22 to a respective disc 12 or 13 so that rotation of the screw strut 16 causes the discs 12 and 13 to be moved simultaneously towards or away from each other. The central disc 14 is moveable by an internal rod 23 which is connected to a bush 24 slideable within the shaft 15 and fixed to the central disc 14 so that axial movement of the rod 23, causes the disc 14 to travel axially along the shaft 15.

The two axially outer disc 12 and 13 have outer cylindrical surfaces which are connected by a cylindrical elastomeric sleeve 25, within which the central drum is slideable. The three discs 12, 13, 14 and sleeve 25 provide a cylindrical surface for the manufacture of a tire carcass.

The two axially outer discs 12 and 13 are substantially the same as each other, and therefore only one of the outer discs will be described in detail. The outer disc 12 is shown at its axially inner position above the shaft 15, and its axially outer position below the shaft 15. The movement of the disc between these two positions is accommodated in the pins 22, connecting the disc 12 to the bush 19, being slideable in axially extending slots 26 in the shaft 15. The disc 12 comprises a body portion 30 having a central neck portion 31 extending axially outwardly for sliding on the shaft 15, a radially outwardly extending disc portion 32 and an outer cylindrical portion 33. The disc portion 32 has an axially inwardly extending annular sleeve 34 thereon which provides a circular slide support surface 35 for a wedge member 36.

On the axially inner side of the disc portion 32 there are located a set of radially expandable bead clamp segments 37 adjacent the disc portion 32 and a set of radially expandable shoulder segments 38. Each set of segments comprises a plurality of arcuate segments and the bead clamp segments 37 and the shoulder segments 38 are arranged in adjacent pairs comprising a bead segment 37 and a shoulder segment 38. Each pair of bead clamp segments 37 and shoulder segments 38 are fixed to the disc portion by pins 39 which locate in radially extending slots 40 and 41 in the two segments 37 and 38 respectively. The slots 40 and 41 allow the segments to move radially relative to the pin 39. The radially inner end of each segment 37 and 38 has a respective inclined surface 42, 43 thereon for engagement with the wedge member 36. The wedge member 36 may be an annular body slideable on the sleeve 34 and having a plurality of inclined faces 44 thereon, that is one face 44 for each pair of aligned segments 37, 38. Alternatively, it is considered that the wedge member could also be formed from an annular array of individual wedges. If, for example, the wedge member 36 is moved towards the disc portion 32 of the disc 12, the inclined faces 44 on the wedge member 36 contact in sequence the like inclined faces 43 and 42 on the shoulder segments 38 and bead clamp segments 37 respectively. Thus the shoulder segments 38 are moved radially outwardly by the wedge member 36 to form an accurate location for an annular tire bead B placed around the former 11, and then the bead clamp segments 37 are moved outwards to clamp a carcass ply (not shown) on the former 11 against the radially inner surface of the bead B.

The wedge member 36 has at least three equiangularly spaced screw threaded bushes 46 arranged on a pitch circle by which it is connected to at least three screw threaded struts 47. The three screw threaded struts 47 are rotatably mounted in bearings 48 located in the disc portion 32 of the disc 12. Simultaneous rotation of the three struts 47 will cause the wedge member 36 to move evenly along the screw threaded struts either towards or away from the body 30 of the disc 12 dependent upon the direction of rotation. The axially outer end of each screw threaded strut 47 is fixed into a planet gear 51. The three planet gears 51 are arranged to mesh with a central sun gear 52 which is arranged concentrically on the central neck portion 31 of the disc 12. The sun gear 52 is free to rotate around the neck portion so that rotation of the sun gear 52 will cause all the planet gears 51 to rotate simultaneously and hence move the wedge member 36. The sun gear 52 is rotated by a motor 53, preferably pneumatic, attached to the axially outer face of the disc portion 32 and which is geared to the sun gear.

The elastomeric sleeve 25 is attached to the bead clamp segments 37 and when the discs 12 and 13 are moved together as in the top half of the drawing the sleeve is collapsable around the central disc 14. Any carcass on the former is inflated into a torroidal configuration by air pressure introduced along the conduit 55, the connector 56, pipe 57 and through the sleeve 25 (via perforations). The axially outward limit of movement of the two discs 12 and 13 is shown in the bottom half of the drawings and may be limited by a stop bar 58 which passes axially through the three discs 12, 13 and 14.

The operation of the former is substantially as described in our co-pending British Patent Application No. 8618649.

FIGS. 2 to 7 show a method also of manufacturing a pneumatic tire utilising the former described above.

Figure 2:
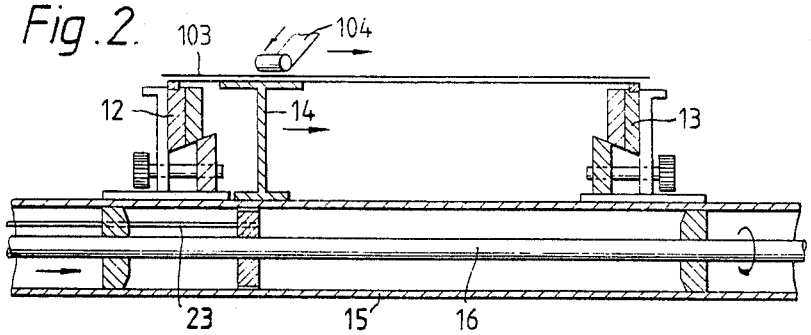

FIG. 2 shows a winding process in which a liner is built by a progressive helical winding of a strip around the former 11. The building former 11 comprises three rotatable discs 12, 13 and 14 and the winding of the strip commences with the two discs 12 and 14 together at the left of the former 11 and as the winding continues the central disc 14 is moved to the right, supporting the liner 103 as it is wound under a moving roller 104, and the winding terminates on a disc 13 with the central disc 14 adjacent the right end of the former 11. The disc 14 is moved along the shaft 15 by operation of the rod 23.

Figure 3:
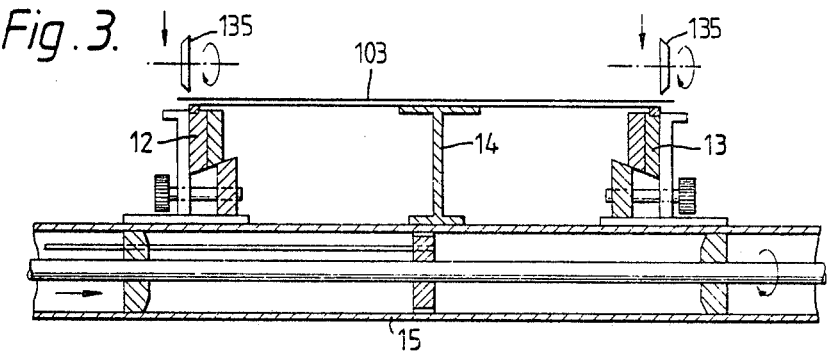

FIG. 3 shows the central disc 14 returned to its central position and the inner liner 103 being cut to length by disc cutters 135.

Figure 4:
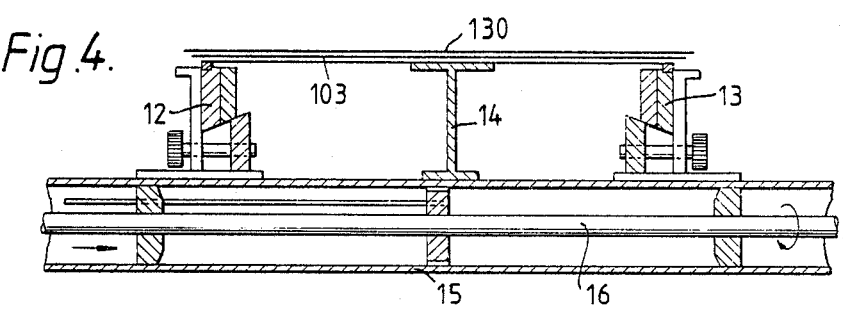

FIG. 4 shows the addition of the carcass reinforcement ply 130 (omitted from the lower part of the drawing) in which the axially end portions of the carcass ply 30 project beyond the edge of the former 11 and in this example the overall diameter of the former, liner 103, and ply 130 is arranged to be slightly less than the internal diameter of bead wire assemblies B (see FIG. 5) which are to be built into the tire carcass.

Figure 5:
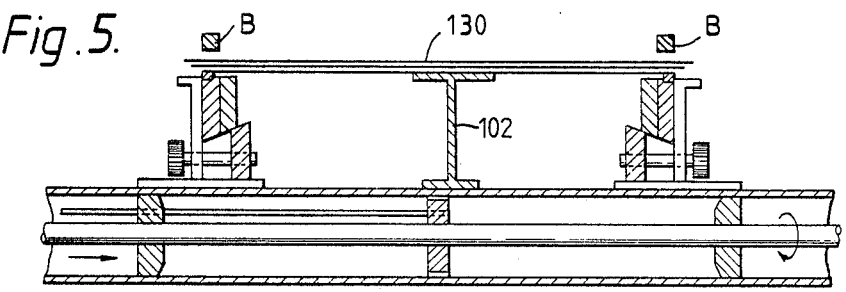
Figure 6:
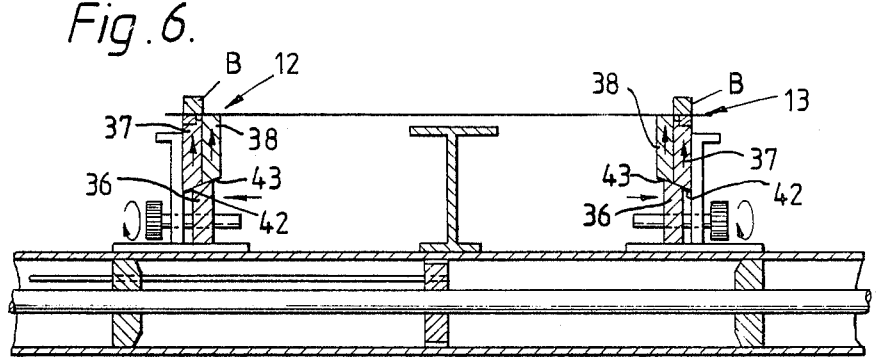

FIG. 5 shows the bead wire assemblies B placed in position over the liner 103 and ply 130 on the former 100 and FIG. 6 shows the expansion of discs 12 and 13 to grip the bead wire assemblies B through the ply 130.

The radially slidable sets of segments 37 and 38 on the discs 12 and 13 are moved radially outwardly by the respective wedge members 36 being moved axially outwardly. The shoulder segments 38 are moved out first to locate the beads B, and then the bead clamp segments 37 move out clamping the ply against the beads. Apex strips and chaffer strips may be added at this stage.

Figure 7:
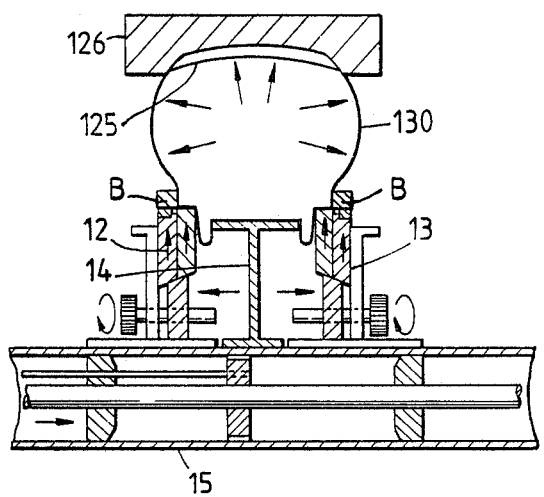

The ply is then tensioned by outward movement of the discs 12 and 13. The carcass 130 is then shaped into engagement with a tread and breaker package 125 carried in a tread moulding ring 126 as shown in FIG. 7. Finally, pre-moulded sidewalls carried on suitable sidewall moulding plates are added and the whole assembly is cured as described in our U.K. Application No. 2134439A.

The sleeve 25 of the former 11 of flexible plastic or elastomeric material extends from one end of the former to the other and is supported on the radially expansible segments 37 and 38. The purpose of the sleeve 25 when the operation of FIGS. 2 and 3 is being carried out, is to support the liner 103 whilst permitting the travelling disc 14 which is maintained in alignment with the roller 104, to move within the sleeve 25 across the axial width of the former between the outer discs 12 and 13. The sleeve 25 is of low-friction material to enable the disc 14 to slide freely within it, and acts to counter any tendency which the axial movement of the disc 14 might otherwise have to pull the windings apart as it moves across.

As illustrated in FIG. 7, during shaping of the tire carcass the central portion of the sleeve 25 is deflected radially inwardly by the inflation pressure, which is retained in the carcass 130 by sealing the inner parts of the former.

I claim:

1. In a cylindrical tire building former having a set of radially expandable segments which are radially moveable by engagement of each segment with a respective cam surface on an axially moveable wedge member characterised the improvement wherein the wedge member is axially moved along a plurality of circumferentially spaced screw struts which are each rotated by a planet gear fixed thereto, the planet gears being driven by a sun gear.

2. A former as claimed in claim 1 in which the improvement further comprising the wedge member being a single annular body having a plurality of inclined faces thereto, one face per segment.

3. A former as claimed in claim 2 wherein the improvement further comprises the set of radially expandable segments being a set of bead clamping segments, with two sets of bead clamp segments one set being located at each end of the former.

4. A former as claimed in claim 3 wherein the improvement further comprises adjacent each set of bead clamp segments a set of radially expandable shoulder segments on the axially inner side of the bead clamp segments, and which are also moveable by the wedge member.

5. A former as claimed in claim 4 including the improvement wherein the drum comprises three coaxial discs mounted on a shaft, two outer discs being simultaneously moveable towards and away from each other, and the central disc being independently moveable between the two outer discs, and one set of radially expandable segments is arranged on each of the two outer discs on the axially inner side thereof, the respective wedge member being slidable on an axially inwardly extending sleeve forming part of the disc.

6. A tire building former as claimed in claim 5 wherein the improvement includes the screw struts for the respective wedge member on each outer disc passing axially through said disc so that the planet gears which are located on the axially outer side of each said disc and the respective sun gears on each disc is rotatably mounted on an axially outward extending sleeve forming part of said disc.

7. A tire building former as claimed in claim 6 wherein the improvement includes the wedge member, planet gears and sun gears being formed from nylon 6 or nylon 66.

8. A tire building former as claimed in claim 6 wherein the improvement includes each sun gear being driven by a motor which is mounted on the axially outer face of the respective disc and which has a drive gear meshing with the respective sun gear.

* * * * *